United States Patent [19]

Watanabe et al.

[11] Patent Number: 5,346,665

[45] Date of Patent: Sep. 13, 1994

[54] METHOD OF BLOW MOLDING AND BLOW MOLDING SYSTEM

[75] Inventors: Yasuto Watanabe; Masao Hara; Takashi Tomita; Tetsuya Nakata; Kenji Moriwaki, all of Hiroshima, Japan

[73] Assignee: Mazda Motor Corporation, Hiroshima, Japan

[21] Appl. No.: 803,216

[22] Filed: Dec. 6, 1991

[30] Foreign Application Priority Data

Dec. 19, 1990 [JP] Japan .................. 2-403590
Dec. 26, 1990 [JP] Japan .................. 2-406955
Dec. 26, 1990 [JP] Japan .................. 2-406956

[51] Int. Cl.$^5$ .................. B29C 49/20; B29C 49/42
[52] U.S. Cl. .................. 264/516; 264/531; 264/541; 264/520; 425/503; 425/526; 425/529
[58] Field of Search .......... 264/531, 532, 516, 515, 264/520, 541; 425/503, 523, 525, 529, 526

[56] References Cited

U.S. PATENT DOCUMENTS

| 3,224,038 | 12/1965 | Budesheim | 264/533 |
| 3,229,006 | 1/1966 | Nohl | 264/541 |
| 3,278,665 | 10/1966 | Harrison | 264/531 |
| 3,452,391 | 7/1969 | Langecker | 264/531 |
| 4,518,558 | 5/1985 | Anway et al. | 264/531 |
| 4,578,028 | 3/1986 | Dirksing et al. | 425/525 |

FOREIGN PATENT DOCUMENTS

| 1454915 | 5/1969 | Fed. Rep. of Germany | 425/525 |
| 51-159623 | 10/1982 | Japan | 264/534 |
| 58-23212 | 5/1983 | Japan . | |
| 61-134223 | 6/1986 | Japan | 264/531 |
| 62-30020 | 2/1987 | Japan . | |
| 62-187012 | 8/1987 | Japan | 264/532 |
| 1145118 | 6/1989 | Japan | 264/531 |

Primary Examiner—Catherine Timm
Attorney, Agent, or Firm—Sixbey, Friedman, Leedom & Ferguson

[57] ABSTRACT

When a resin article having at least one thickened part is blow-molded, a parison is extruded and suspended between halves of a blow mold the inner surface of which defines the outer shape of the article to be molded. An expander panel is inserted into the space inside the parison, and is moved toward the part of the inner surface of the blow mold corresponding to the thickened part of the article to press thereagainst a part of the parison. Then the blow mold is closed and pressurized gas is blown into the parison.

13 Claims, 24 Drawing Sheets

F I G.5
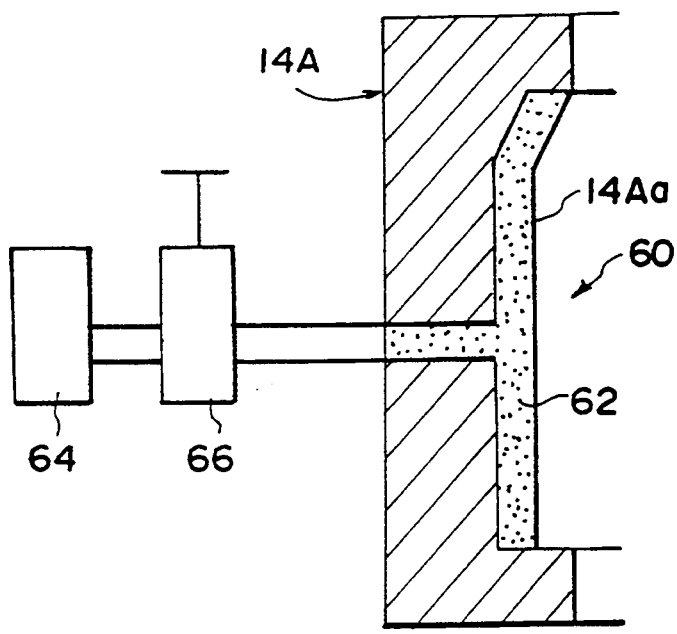

FIG.20
FIG.21
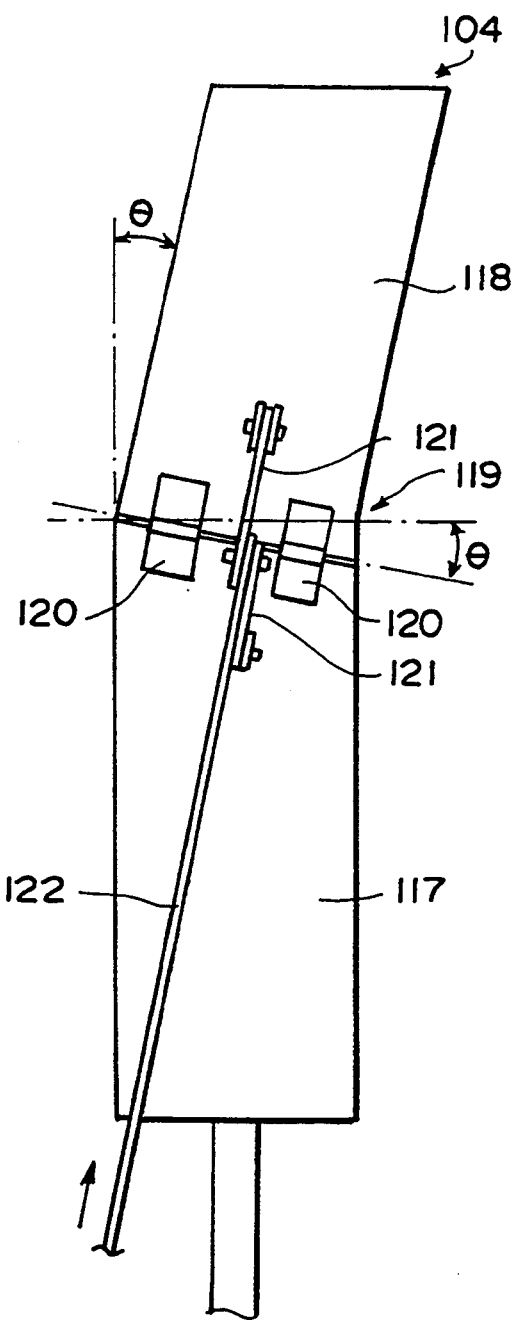
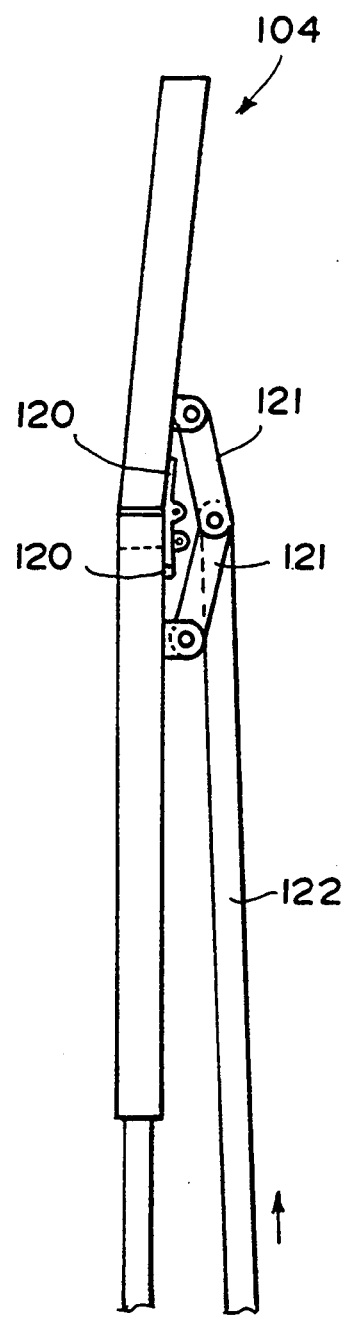

F I G. 29
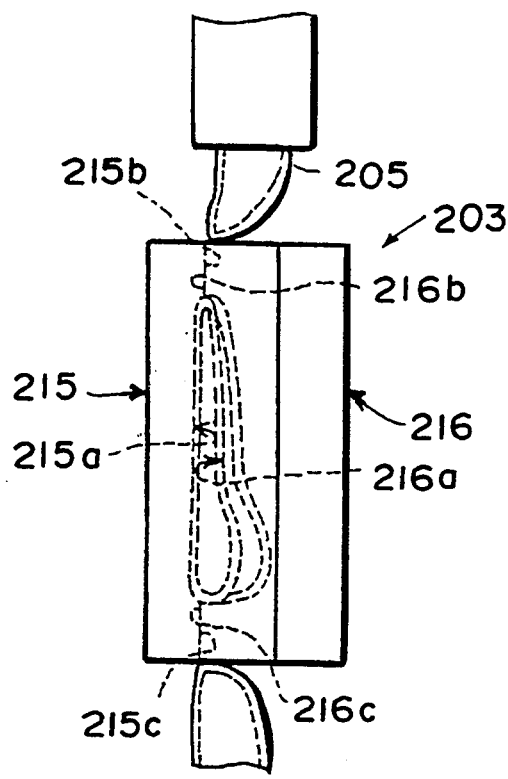
F I G. 30
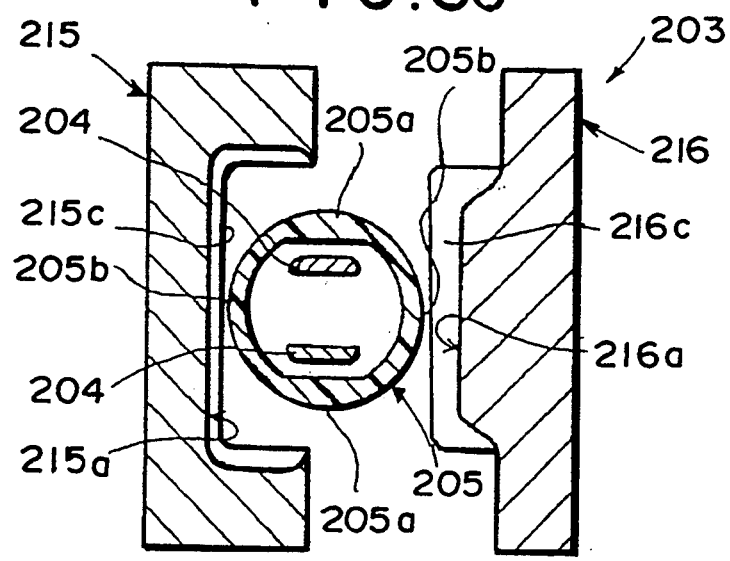

METHOD OF BLOW MOLDING AND BLOW MOLDING SYSTEM

BACKGROUND OF THE INVENTION

1. Field of the Invention

This invention relates to a method of blow molding of resin articles and a blow molding system for carrying out the method.

2. Description of the Prior Art

As disclosed, for instance, in Japanese Patent Publication No. 58(1983)-23212, in the blow molding of a resin article, a parison extruded from an extruder is sandwiched between halves of a blow mold and then gas is blown into the blow mold under pressure so that the parison conforms to the inner surface of the mold. Recently, blow molding technique of high-strength material such as reinforced resin has been developed, and there is an increasing possibility of producing structural members by blow molding. However, in the case of a structural member, the parts of the member which supports load must be large in thickness and the thickness must be controlled with a high accuracy, which makes it difficult to produce structural members by blow molding.

For example, when a seat back frame for a car shown in FIG. 11 is blow-molded, opposite side portions must be thicker than the central part. When molding the article, a parison 51 (FIG. 12) is thickened at a pair of predetermined regions 51a diametrically opposed to each other as compared with the other regions 51b.

Such a nonuniformly thickened parison 51 is conventionally obtained by effecting die-shaving (See, for instance, Japanese Unexamined Patent Publication No. 62(1987)-30020.) or core-shaving for an accumulator head of a parison extruder. FIG. 13 shows an accumulator head 55 of a parison extruder provided with a core shaving. As shown in FIG. 13, a parison 51 is extruded downward through an annular gap 54 between a core 52 and a ring die 53. The core 52 is shaved at portions corresponding to the portions of the parison 51 to be thickened, whereby the gaps 54a and 54b are enlarged at the portions. The portions of the parison 51 extruded through the gaps 54a and 54a are larger in thickness than the other portions. When such a parison 51 is blown, the respective portions are stretched and a blown article is obtained. Also in the blown article, the portions of the article formed by the thicker portions of the parison 51 are thicker than the other portions and have desired strength.

However, this method of extruding the parison 51 is disadvantageous in that, when the parison 51 is extruded through accumulator head 55 having such a shaved core, the speed at which the parison is extruded through the gaps 54a and 54b differs from that at which the parison is extruded through the other portion of the gap 54, and due to this difference in extruding speed, the surface of the extruded parison can be corrugated (51c) as shown in FIG. 14 or the parison cannot be straight in shape if the nonuniformity in the thickness exceeds a predetermined limit. Thus in accordance with the known method, a blown article having a large nonuniformity in the thickness cannot be molded.

Further, since, unlike the injection molding, only the outer side of the parison is pressed against the die surface in the blow molding, it becomes very difficult to precisely control the thickness of the wall as the shape of the molded article becomes complicated.

SUMMARY OF THE INVENTION

In view of the foregoing observations and description, the primary object of the present invention is to provide a method of blow molding in which the thickness of the wall of a selected part of an article can be precisely controlled.

Another object of the present invention is to provide a blow molding system for carrying out the method.

The method in accordance with the present invention is characterized by the steps of suspending a parison between halves of a blow mold the inner surface of which defines the outer shape of an article to be molded, inserting an expander panel into the space inside the parison, the expander panel having an abutment surface which substantially conforms in shape to a part of the inner surface of the blow mold which corresponds to a part of the article the thickness of which is to be larger than the other part of the article, moving the expander panel toward said part of the inner surface of the blow mold to press thereagainst said abutment surface of the expander panel sandwiching therebetween a part of the parison, closing the blow mold and blowing pressurized gas into the parison.

The blow molding system in accordance with the present invention comprises an extruder which extrudes a parison and suspends it, a blow mold having an inner surface which defines the outer shape of an article to be molded and formed of mold halves which are closed with the suspended parison intervening therebetween, an expander panel which is inserted into the space inside the parison and is provided with an abutment surface which substantially conforms in shape to a part of the inner surface of the blow mold corresponding to a part of the article the thickness of which is to be larger than the other part of the article, an expander panel driving mechanism which moves the expander panel toward said part of the inner surface of the blow mold to press thereagainst said abutment surface of the expander panel sandwiching therebetween a part of the parison, and means for blowing pressurized gas into the parison.

When a part of the parison is in contact with an expander panel during the expansion step, the part is cooled and becomes harder than the other part, and accordingly the part is less stretched and becomes thicker than the other part. Further when the part of the parison is pressed against the inner surface of the blow mold before blowing is initiated, the part is further cooled and becomes further harder, and accordingly, the part is hardly stretched during blowing, whereby the part of the blown article corresponding to the part which has been pressed against the inner surface of the mold becomes thicker than the other part. Thus the part of the parison for forming the thickened part of the article need not be thickened as the parison is extruded from the extruder.

In the case where the difference in thickness between the thickened part and the other part is large, it is preferred that the part of the parison for forming the thickened part of the article be thickened to some extent when the parison is extruded. However, in accordance with the present invention, since the part of the parison for forming the thickened part of the article is hardly stretched and hardly thinned by the blowing while the other part is stretched and thinned by the blowing, the difference in thickness in the parison need not be so large as that in the blown article.

BRIEF DESCRIPTION OF THE DRAWINGS

FIG. 5 is cross-sectional view showing still another example release facilitating means, FIG. 20 is a front view showing an expander panel in the operative position which is free from the drawback inherent to the expander panel shown in FIGS. 16 and 17, FIG. 21 is a side view showing the same, FIG. 29 is a front view showing the blowing step, FIG. 30 is a cross-sectional view of FIG. 27.

DESCRIPTION OF THE PREFERRED EMBODIMENT

Figure 1A:
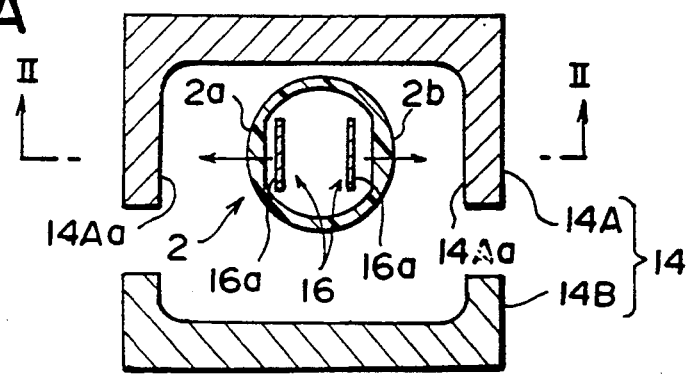
FIG. 1A is a cross-sectional view taken along II—II in FIG. 2 showing a part of a blow molding system in accordance with a first embodiment of the present invention.
Figure 1B:
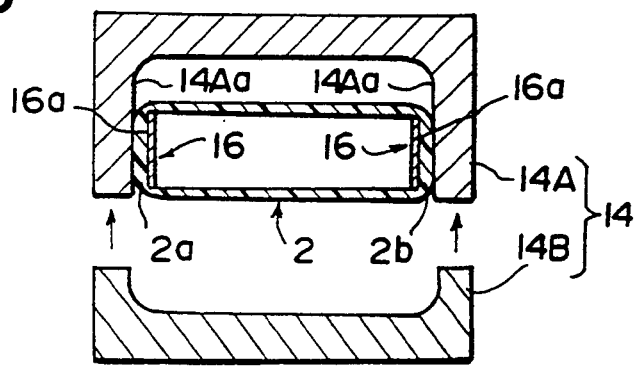
FIG. 1B is a view similar to FIG. 1A but showing the part in another stage of the molding operation.
Figure 1C:
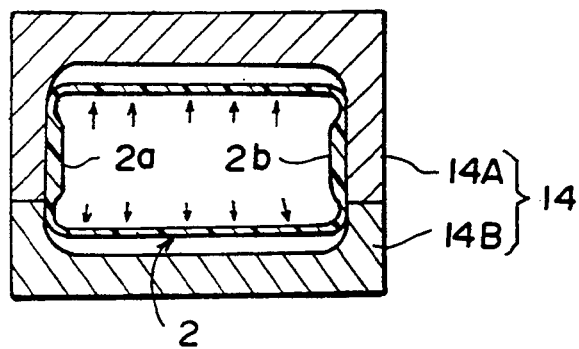
FIG. 1C is a view similar to FIG. 1A but showing the part in still another stage of the molding operation.
Figure 2:
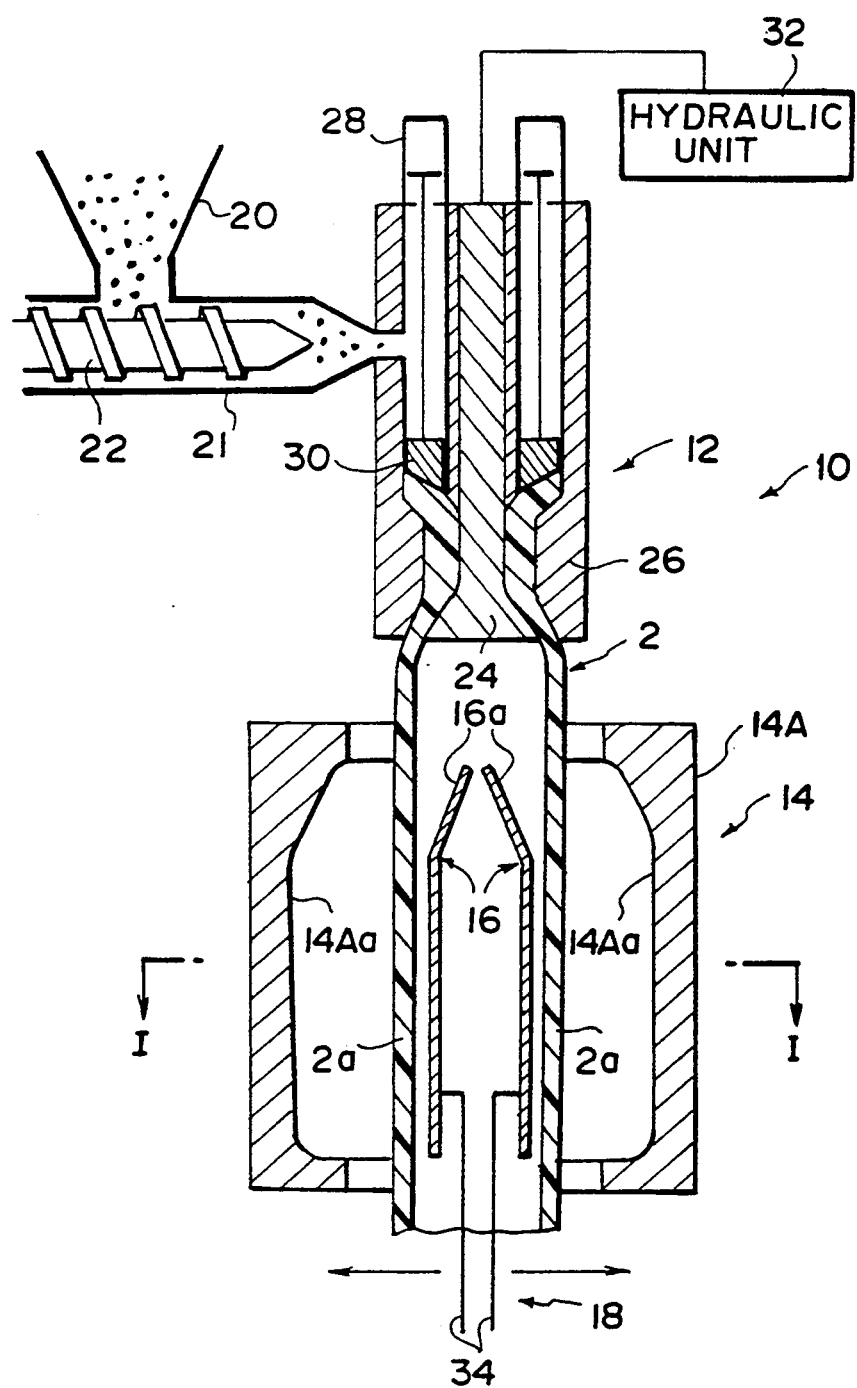
FIG. 2 is a cross-sectional view taken along line II—II in FIG. 1A showing the blow molding system of the first embodiment.

In FIGS. 1 and 2, a blow molding system 10 comprises an extruder 12 which extrudes a parison 2 and a blow molder (not shown) which opens and closes a blow mold 14 and blows pressurized gas into the parison. The blow molder is well known and its structure has little to do with the present invention and will not be described here. As clearly shown in FIG. 1A, the parison 2 as extruded from the extruder 12 is thickened at portions 2a and 2b diametrically opposed to each other. The blow mold 14 comprises a pair of mold halves 14A and 14B which are closed with the parison 2 intervening therebetween when the pressurized gas is blown into the parison 2. The blow mold 14 has an inner surface which defines the outer shape of an article to be molded. The blow molding system 10 further includes a pair of expander panels 16 and an expander panel driving mechanism 18. Each of the expander panels 16 has an abutment surface 16a which conforms in shape to a part 14Aa of the inner surface of the blow mold 14 which defines a part of the article to be thickened. Such a part of the inner surface of the blow mold 14 will be referred to as "thickened-part-defining part", hereinbelow. The expander panel driving mechanism 18 inserts the expander panels 16 into the space inside the parison 2 and moves them toward the thickened-part-defining parts 14Aa of the inner surface of the blow mold 14 to press thereagainst the abutment surfaces 16a with the thickened portions 2a and 2b of the parison 2 sandwiched therebetween. In this particular embodiment, the thickened-part-defining parts 14Aa are formed in the mold half 14A.

In the extruder 12, resin material fed in a hopper 20 is fed through a cylinder 21 by a screw 22 while being heated to melt, and the molten resin is fed into a chamber formed between a core 24 and a die 26. The molten resin in the chamber is then pushed downward by a ring piston 30 which is driven by a cylinder 28 and extruded through a die slit formed on the lower end of the assembly of the core 24 and the die. Thus the parison 2 which is substantially cylindrical is extruded and suspended downward. The die slit has a larger width at a pair of portions diametrically opposed to each other in order to for said thickened portions 2a and 2b of the parison 2. The width of the die slit can be changed by moving the core 24 up and down by a hydraulic unit 32. Thus the the thickness of the parison 2 can be made nonuniform in the longitudinal direction of the parison 2.

The expander panel driving mechanism 18 has a pair of expander pins 34 respectively fixed to the expander panels 16, and moves the expander panels 16 toward and away from the inner surface of the blow mold 14 by moving the expander pins 34.

The operation of the blow molding system 10 in accordance with the present invention will be described, hereinbelow.

As shown in FIGS. 1A and 2, the extruder 12 extrudes the parison 2 and suspends between the mold halves 14A and 14B. Then the expander panel driving mechanism 18 inserts the expander panels 16 into the parison 2 and moves it horizontally away from each other toward the respective thickened portions 2a and 2b of the parison 2, thereby pressing the thickened portions 2a and 2b against the thickened-part-defining parts 14Aa of the mold half 14A as shown in FIG. 1B. Then the expander panel driving mechanism 18 moves the expander panels 16 inward toward each other and moves downward away from the parison 2. Then the blow molder closes the blow mold 14 and blows pressurized gas into the parison 2, i.e., effects blow molding as shown in FIG. 1C.

As can be understood from the description above, in accordance with this embodiment, the thickened portions 2a and 2b of the parison 2 are pressed against the thickened-part-defining parts 14Aa prior to blowing and cooled more than the other parts, whereby flowability of the thickened portions 2a and 2b deteriorates and the thickness of the thickened portions 2a and 2b is kept substantially unchanged during blowing. Thus in accordance with this embodiment, the thickness of a part of the article can be easily controlled with a high accuracy even if the degree of nonuniformity in thickness is large.

In order to facilitate release of the expander panels 16 from the parison 2, it is preferred that a release facilitating means be provided.

A few examples of the release facilitating means will be described with reference to FIGS. 3 to 5, hereinbelow.

Figure 3:
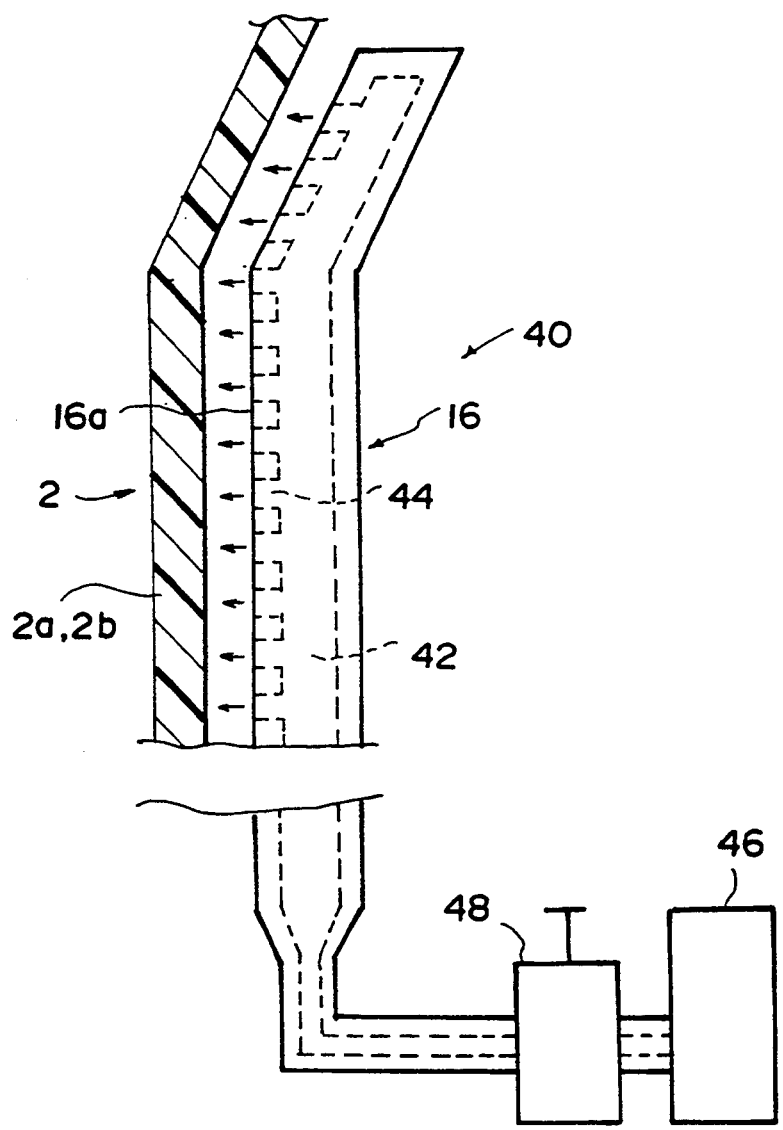
FIG. 3 is a cross-sectional view showing an example of release facilitating means.

The release facilitating means 40 shown in FIG. 3 is provided in the expander panels 16. The release facilitating means 40 of this example comprises an air passage 42 formed in the expander panel 16, a plurality of air ports 44 which are communicated with the air passage 42 and open in the abutment surface 16a of the expander panel 16, a compressor 46 and a control valve 48 which controls supply of air to the air passage 42. The release facilitating means 40 applies vacuum to the air ports 44 immediately after the expander panels 16 are brought into contact with the parison 2 to remove void between the expander panels 16 and parison 2, and after the parison 2 is pressed against the inner surface of the mold half 14A, the release facilitating means blows air through the air ports 44 to facilitate release of the expander panels 16 from the parison 2.

Figure 4A:
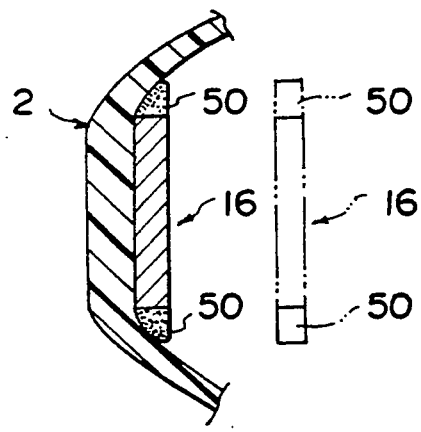
FIG. 4A is a cross-sectional view showing another example of release facilitating means.
Figure 4B:
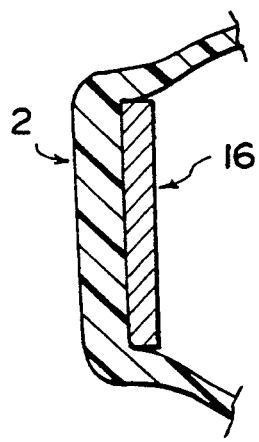
FIG. 4B is a view for illustrating the operation of the release facilitating means shown in FIG. 4A.

Also the release facilitating means shown in FIGS. 4A is provided in the expander panels 16. The release facilitating means of this example comprises a flexible member 50 fixed to the side edges of the expander panels 16 over the entire length thereof. If the flexible member 50 is not provided, the parison 2 can be cooled and shrink to catch the expander panels 16 as shown in FIG. 4B when it is pressed against the mold half 14A. On the other hand, when the flexible member 50 is provided, the shrinkage of the parison 2 can be accommodated by deformation of the flexible member 50 as shown in FIG. 4A. The material of the flexible member 50 may be selected according to the temperature of the parison 2 and the like, and may be, for instance, TPE, rubber or the like. This release facilitating means is advantageous in that it is simple in structure.

The release facilitating means 60 shown in FIG. 5 is provided in the mold half 14A. The release facilitating means 60 comprises a porous member 62 which forms the thickened-part-defining part 14Aa of the mold half 14A, and an assembly of a compressor 64 and a control valve 66 for selectively applying pressurized air and suction to the porous member 62. The release facilitating means 60 applies vacuum to the porous member 62 immediately after the parison 2 is pressed against the thickened-part-defining part 14Aa, thereby attracting the parison 2 toward the thickened-part-defining part 14Aa and facilitating release of the expander panels 16 from the parison 2, and blows air toward the porous material 62 after the blow molding to facilitate release of the blown article. The release facilitating means 60 is advantageous in that since the surface of the thickened portions 2a and 2b in contact with the mold half 14A quickly increase in viscosity, the thickened portions 2a and 2b are easily fixed in place during blowing.

Though, in the embodiment described above, the expander panels 16 and the expander pins 34 are fixed, and the expander panels 16 are retracted away from the parison 2 when the blowing is effected, the expander panels 16 may be left on the parison 2 and the blowing may effected with the expander panels 16 kept on the parison 2.

A few examples of the structure for releasably connecting the expander panels 16 to the expander pins 34 will be described with reference to FIGS. 6, 7 and 8, hereinbelow.

Figure 6:
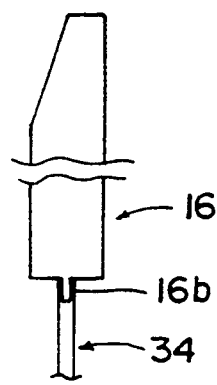
FIG. 6 is a view showing an example of the structure for releasably connecting the expander panels to the expander pins.

In the structure shown in FIG. 6, the expander pin 34 has a tubular end portion and the expander panel 16 is provided with a projection 16b extending downward. The expander panel 16 is held on the expander pin 34 by inserting the projection 16b into the tubular end portion of the expander pin 34, and is left on the parison 2 by moving downward the expander pin 34.

Figure 7A:
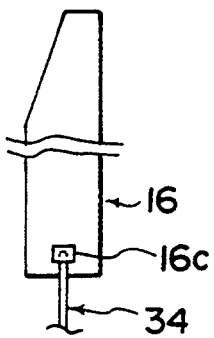
FIGS. 7A and 7B are fragmentary views showing another example of the structure for releasably connecting the expander panels to the expander pins.
Figure 7B:
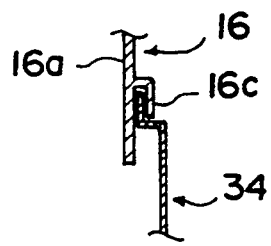

In the structure shown in FIGS. 7A and 7B, the upper end portion of the expander pin 34 is cranked and an engagement portion 16c if provided on the rear surface of the expander panel 16. The expander panel 16 is held on the expander pin 34 by engaging the engagement portion of the expander panel 16 with the cranked upper end portion of the expander pin 34 from above, and is left on the parison 2 by moving downward the expander pin 34.

Figure 8:
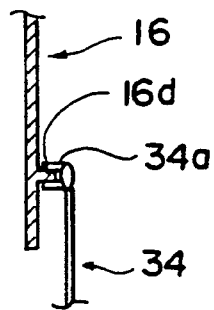
FIG. 8 is a fragmentary view showing still another example of the structure for releasably connecting the expander panels to the expander pins.

In the structure shown in FIG. 8, a clamp mechanism 34a is provided on the upper end portion of the expander pin 34 and a projection 16d is provided on the rear surface of the expander panel 16. In this structure, the expander panel 16 can be released from the expander pin 34 by moving horizontally away from the expander panel 16.

By leaving the expander panels 16 on the parison 2 in the manner described above, facilitation of release of the expander panels 16 need not be considered, and at the same time, the expander panels 16 left on the blown article function as reinforcement.

Figure 9A:
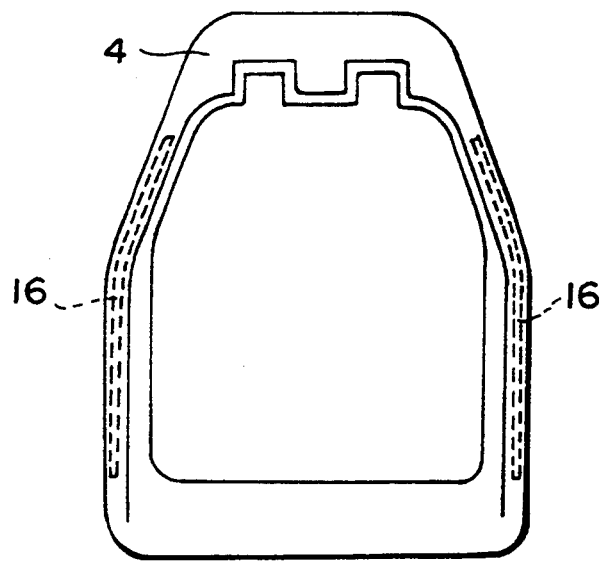
FIG. 9A is a front view of a seat back frame molded by the blow molding system of the present invention.

FIG. 9A shows a seatback frame 4 molded in accordance with this embodiment. The seatback frame 4 is thicker at opposite side portions where a higher strength is required and the expander panels 16 are left on the side portions to reinforce there.

Figure 9B:
FIG. 9B is a view showing a modification of the expander panel.
Figure 9C:
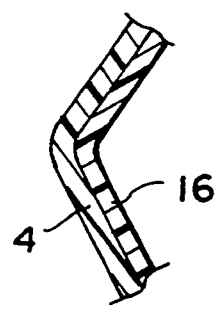
FIG. 9C is a view showing another modification of the expander panel.

The expander panel 16 need not be uniform in thickness but may have a nonuniform thickness as shown in FIG. 9B. By changing the shape and/or thickness of the expander panel 16, seatback frames for different load conditions can be molded without changing the mold so long as the shape of the articles are the same. In this case, it is preferred that the expander panel 16 be of the same material as the article.

By forming the expander panels 16 of resin not provided with reinforcing agent, e.g., polyester or polypropylene when the seatback frame 4 is molded of reinforced resin such as polypropylene, the non-reinforced resin prevents broken pieces of the reinforced resin from flying in all direction in case where excessive load acts on the side portions of the seatback frame 4 and brittle fracture of the side portions occurs.

Figure 10A:
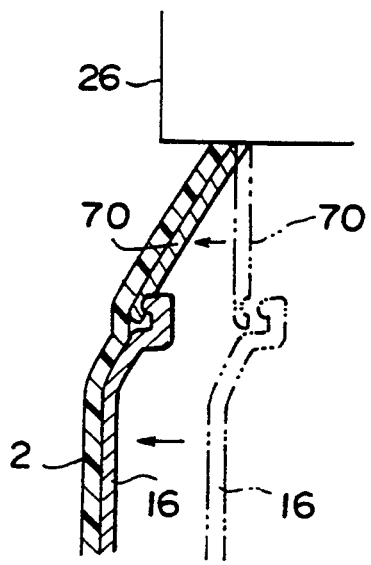
FIG. 10A is a fragmentary cross-sectional view showing the parison holding member.
Figure 10B:
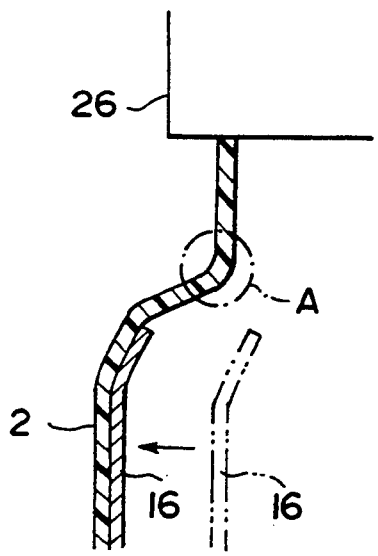
FIG. 10B is a view for illustrating the operation of the parison holding member.
Figure 11:
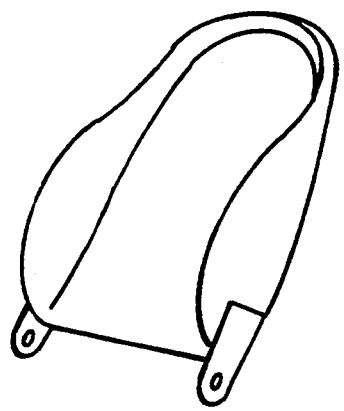
FIG. 11 is a perspective view showing a blown seatback frame.
Figure 12:
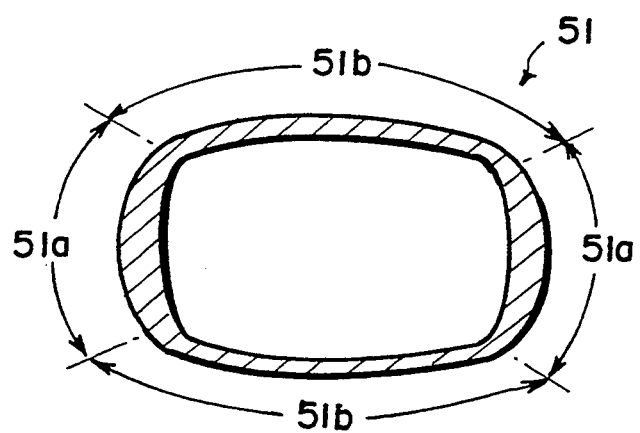
FIG. 12 is a cross-sectional view of a parison used for molding the seatback frame.
Figure 13:
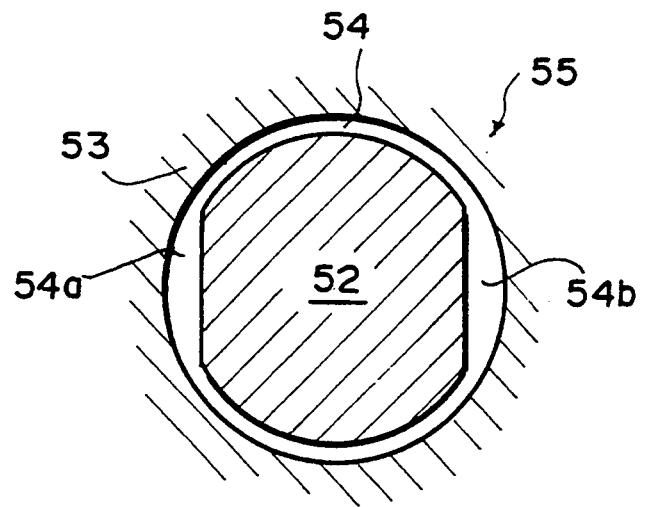
FIG. 13 is a cross-sectional view of a shaved accumulator head for forming the parison.
Figure 14:
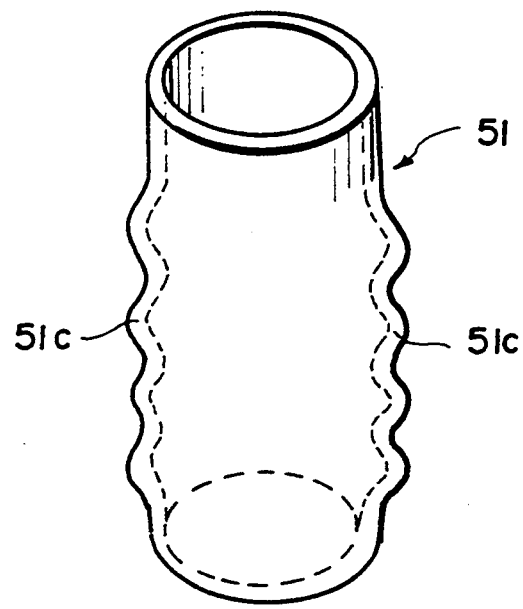
FIG. 14 is a perspective view showing the drawback of the prior art.

It is preferred that a parison holding member 70 be provided as shown in FIG. 10A. The parison holding member 70 is pivoted on the extruder 26 and prevents the parison 2 from being sharply bent at an upper portion indicated at A in FIG. 10B when the expander panels 16 pushes the parison 2 toward the inner surface of the mold half 14A. When the parison 2 is sharply bent, the parison 2 can crack. The parison holding member 70 has an engagement recess at the lower end thereof which is adapted to be engaged with an engagement projection formed on the upper end of the expander panel 16. When the expander panel 16 pushes the parison 2, the parison holding member 70 is swung outward by the engagement between the engagement recess and the engagement projection and pushes the upper portion of the parison 2, whereby the parison 2 can be prevented from being sharply bent as shown in FIG. 10A.

Though, in the embodiment described above, the expander panels can be easily drawn out from the parison 2, after they presses the parison 2 against the inner surface of the mold, by moving straight downward the expander panels, sometimes the shape of the article to be molded does not permit the expander panels to be easily drawn out.

Figure 15:
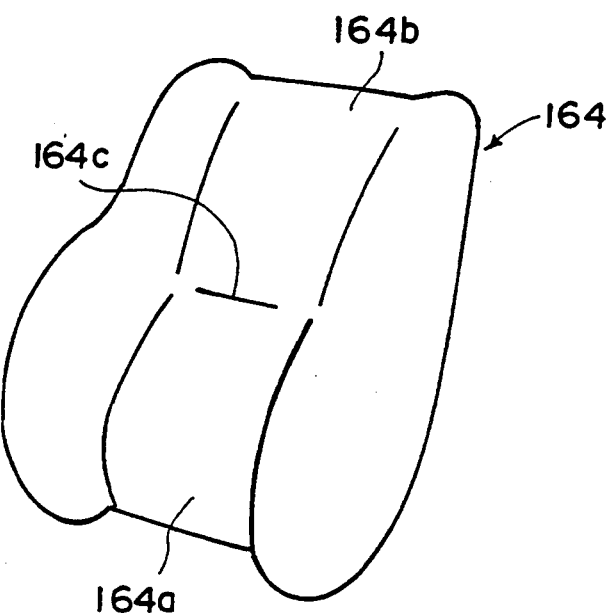
FIG. 15 is a perspective view showing another blown seatback frame.

For example, when a seatback frame 164 whose upper portion 64b is at an angle to the lower portion 164a at a bent portion 164c as shown in FIG. 15 is molded in accordance with the present invention, there arises the following problem.

Figure 16:
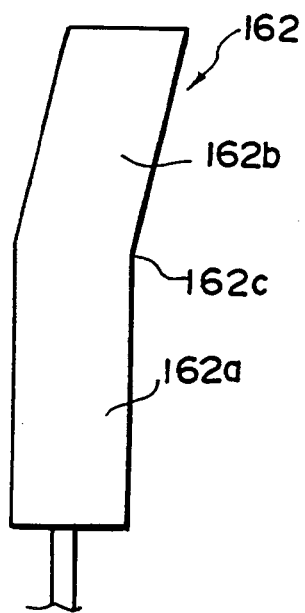
FIG. 16 is a front view showing an expander panel used for molding the seatback frame shown in FIG. 20.
Figure 17:
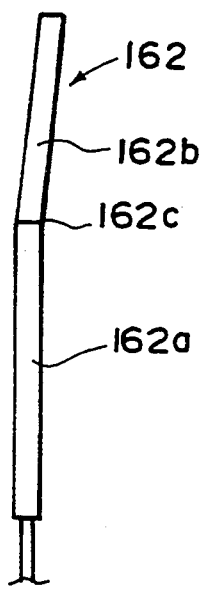
FIG. 17 is a side view of the expander panel shown in FIG. 16.
Figure 18:
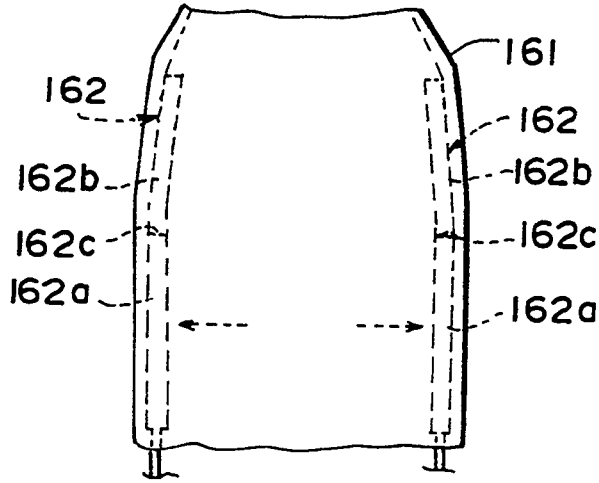
FIG. 18 is a front view showing expander panels in the position where they are pressing the parison against the inner surface of the blow mold.
Figure 19:
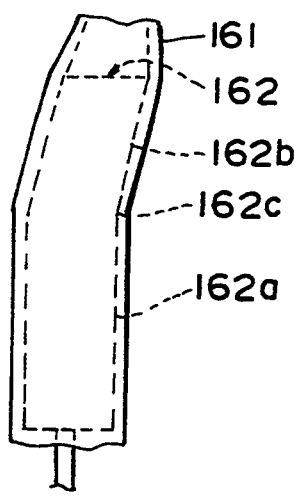
FIG. 19 is a side view of the same.
Figure 22:
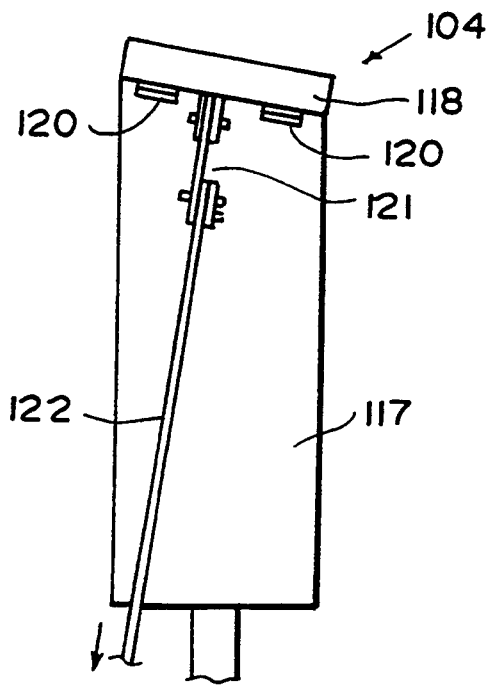
FIG. 22 is a front view showing the expander panel in the folded position.
Figure 23:
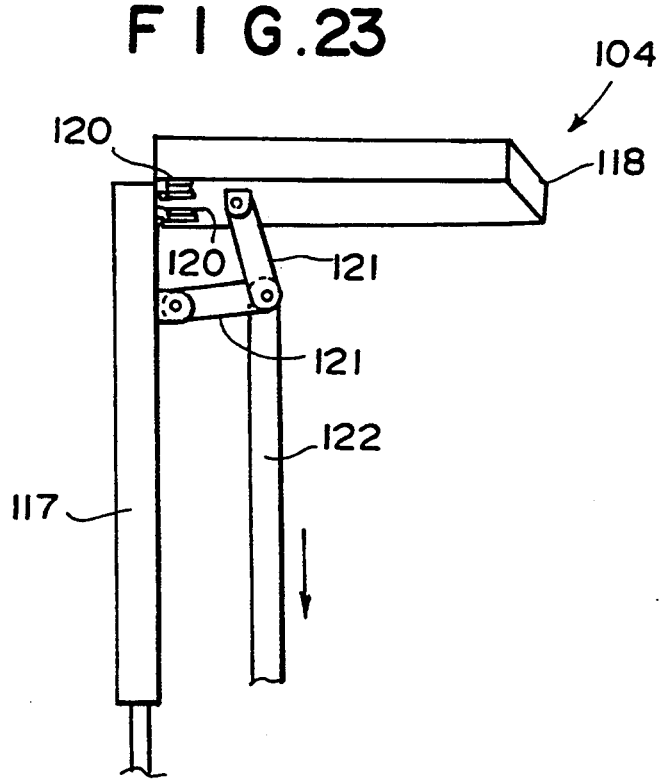
FIG. 23 is a side view of the same.

That is, in order to press the parison 161 (FIGS. 18 and 19) for such a seatback frame 164 against the inner surface of the mold, expander panels 162 must be shaped to conform to the shape of the seatback frame 164 as shown in FIGS. 16 and 17. That is, each expander panel 162 is bent at an intermediate portion 162c and the upper portion 162b of the expander panel 162 is at angle to the lower portion 162a. Accordingly, after the expander panels 162 press the parison 161 against the inner surface of the mold as shown in FIGS. 18 and 19, the expander panels 162 interfere with the parison 161 when the expander panels 162 are drawn out from the parison 161 and it is very difficult to draw out the expander panels 162 without deforming the parison 161.

Now an example of the expander panel which is suitable for molding the seatback frame 164 shown in FIG. 15 will be described with reference to FIGS. 20 to 23, hereinbelow.

The expander panel 104 of this example is bent at an intermediate portion 119 and the upper portion 118 from which the expander panel 104 is inserted into the parison is at an angle θ to the lower portion 117. The expander panel 104 is divided into two along a line near the bent portion 119. The lower and upper portions 117 and 118 are connected by a pair of hinges 120 which are fixed to the rear surfaces of the lower and upper portions 117 and 118. A connecting plates 121a and 121b are pivoted respectively on the lower and upper portions 117 and 118 at one ends and are rotatably connected to a drive plate 122 at the other ends. With this arrangement, by moving up and down the drive plate 122, the upper portion 118 is moved between an operative position shown in FIGS. 20 and 21 in which the expander panel 104 is moved to press the parison against the inner surface of the blow mold and a folded position shown in FIGS. 22 and 23 in which the upper portion 118 is substantially at 90° to the lower portion and in which the expander panel 104 is drawn out from the parison. The line along which the expander panel 104 is divided is inclined relative to the transverse direction of the expander panel 104 by the same angle as the angle θ by which the expander panel 104 is bent. Accordingly, in the folded position, the longitudinal center line of the upper portion 118 lies in the plane which includes the longitudinal center line of the lower portion 117 and is parallel to the direction in which the expander panel 104 is moved when it presses the parison against the inner surface of the blow mold. In the folded position, the upper portion 118 of each expander panel is in the space above the space between the opposed thin portions which are formed by the action of the lower portions 117 of the respective expander panels 104. Accordingly, by moving the upper position 118 to the folded position by moving downward the drive plate 122 when the expander panel 104 is to be drawn out from the parison, the expander panel 104 can be drawn out without interfering with the parison.

The blow mold is generally provided with projections at the lower end thereof which pinch off lower end portion of the parison in response to closure of the mold. Depending on the shape of the blowing article or the shape of the blow mold, the projections can interfere with the expander panels to prevent drawing of the expander panels.

Now several examples of blow molds which are free from the problem will be described, hereinbelow.

Figure 24:
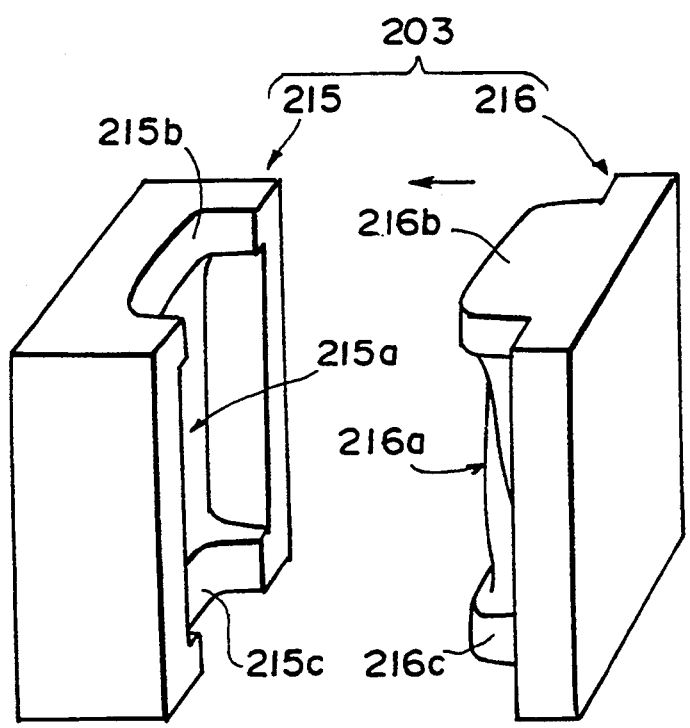
FIG. 24 is a perspective view of a blow mold which is suitable for use in the blow molding system of the present invention.

In FIG. 24, a blow mold 203 is for molding the seatback frame shown in FIG. 15 and comprises left and right mold halves 215 and 216. The parison is pressed against the inner surface of the left mold half 215 in this particular embodiment. The left mold half 215 is provided with upper and lower cutaway portions 215b and 215c above and below a cavity 215a on the face opposed to the right mold half 216. The lower cutaway portion 215c is substantially equal to the cavity 215a both in depth and width. The right mold half 216 is provided above and below a cavity 216a with upper and lower protrusions 216b and 216c which are respectively mated with the upper and lower cutaway portions 215b and 215c when the blow mold 203 is closed.

Figure 25:
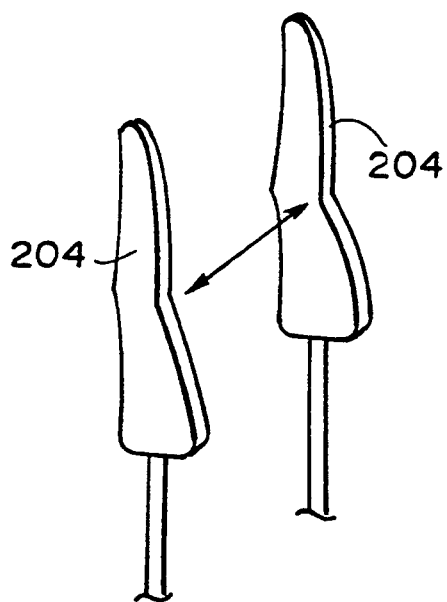
FIG. 25 is a perspective view showing expander panels suitable for use with the blow mold shown in FIG. 24.

A pair of expander panels 204 shown in FIG. 25 are moved toward and away from each other and up and down by an expander panel driving mechanism which is not shown.

Figure 26:
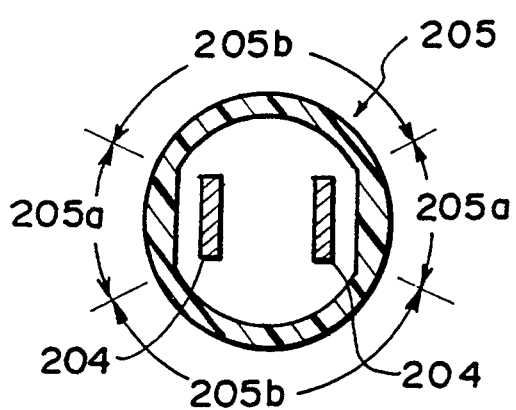
FIG. 26 is a cross-sectional view showing the state the expander panels are inserted into the parison.

When the seatback frame is molded, a parison 205 having a pair of thickened portions 205a and a pair of thin portions 205b as shown in FIG. 26 is used.

Figure 27:
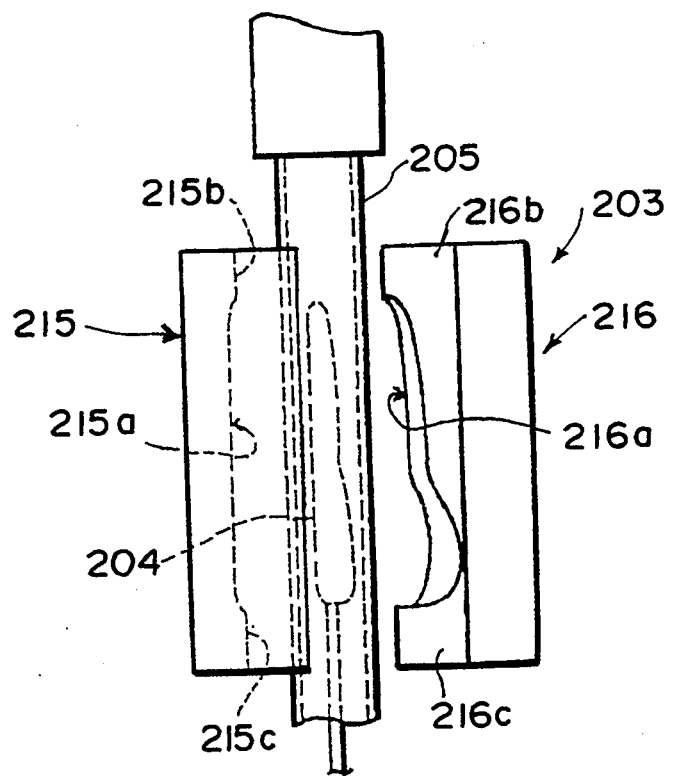
FIG. 27 is a front view showing a parison suspended between the mold halves of the blow mold shown in FIG. 24.
Figure 28:
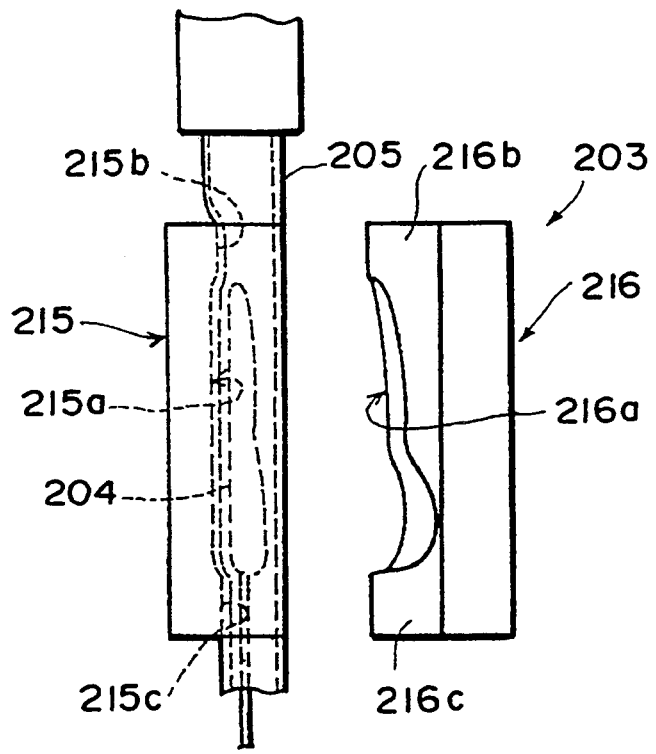
FIG. 28 is a front view for illustrating the step of expanding the parison by the expander panel shown in FIG. 25.
Figure 31:
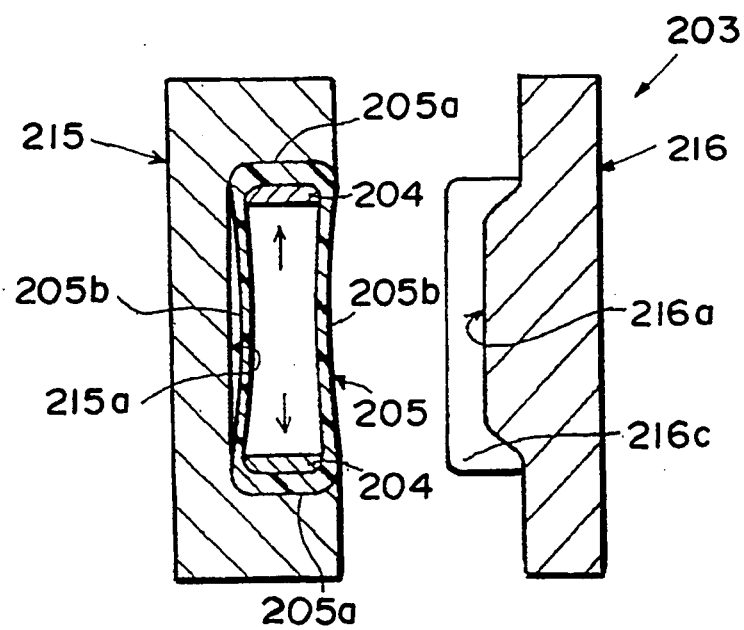
FIG. 31 is a cross-sectional view of FIG. 28.

The expander panels 204 are inserted into the parison 205 from below as shown in FIGS. 27 and 30 and then the expander panels 204 and the left mold half 215 are moved relative to each other so that the expander panels 204 are opposed to the side portions of the inner surface of the left mold half 215 with the thickened portions 205a intervening therebetween. Thereafter the expander panels 204 are moved toward the side portions of the left mold half 215 to press the thickened portions 205a of the parison 205 against the inner surface of the side portions as shown in FIGS. 28 and 31. At this time, since the parison 205 is stretched with the thickened portions 205a in contact with the expander panels 204, stretch of the thickened portions 205a is suppressed and the thin portions 205b is mainly stretched and is further thinned.

The expander panels 204 are subsequently drawn downward. By virtue of the lower cutaway portion 215c, the expander panels 204 can be smoothly drawn without interference with the left mold half 215.

Figure 32:
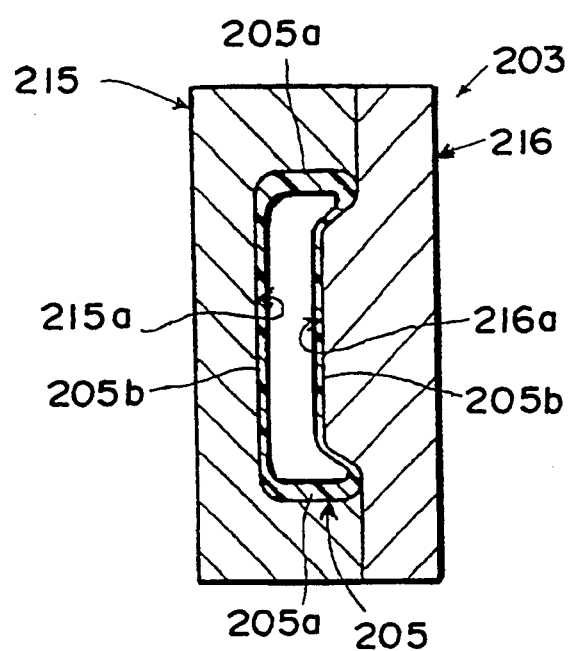
FIG. 32 is a cross-sectional view of FIG. 29.

Thereafter, the right mold half 216 is moved toward the left mold half 215 to close the blow mold 203 as shown in FIGS. 29 and 32, and the blow molding is effected. When the blow mold 203 is closed, the upper and lower protrusions 216b and 216c are mated with the upper and lower cutaway portions 215b and 215c, whereby the parison 205 is pinched off at upper and lower portions.

The blow mold 221 comprises left and right mold parts 222 and 223 and left and right pinch-off molds 224 and 225 which are provided under the left and right mold parts 222 and 223. The surfaces against which the thickened portions 205a are to be pressed are defined by both the left and right mold parts 222 and 223 in this example. The left pinch-off mold 224 is movable left and right relative to the left mold part 222, and the right pinch-off mold 225 is movable left and right relative to the right mold part 223. The cavity is defined by cavity portions 22a to 25a formed in the mold parts 222 and 223 and the pinch-off molds 224 and 225 when the blow mold 221 is closed as shown in FIG. 37.

Figure 33:
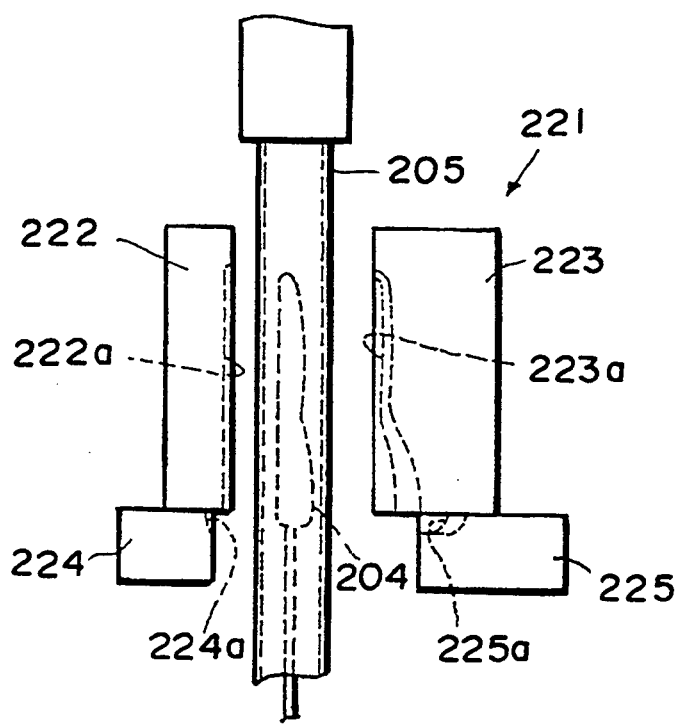
FIG. 33 is a view similar to FIG. 27 but showing the parison with another blow mold which is suitable for use in the blow molding system of the present invention.
Figure 34:
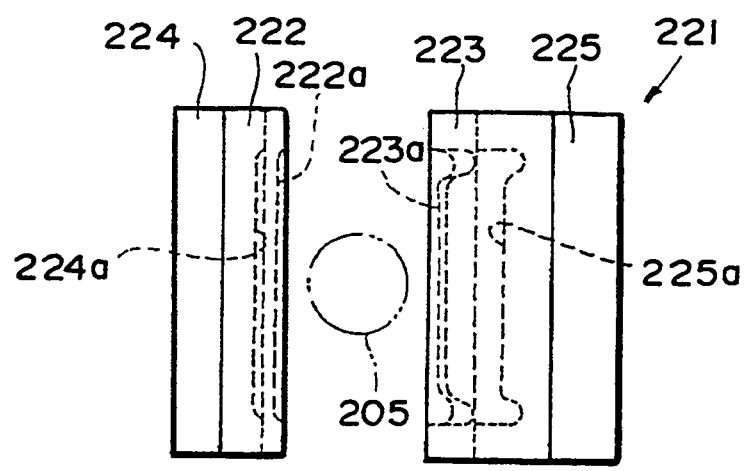
FIG. 34 is a plan view of the blow mold shown in FIG. 33.
Figure 35:
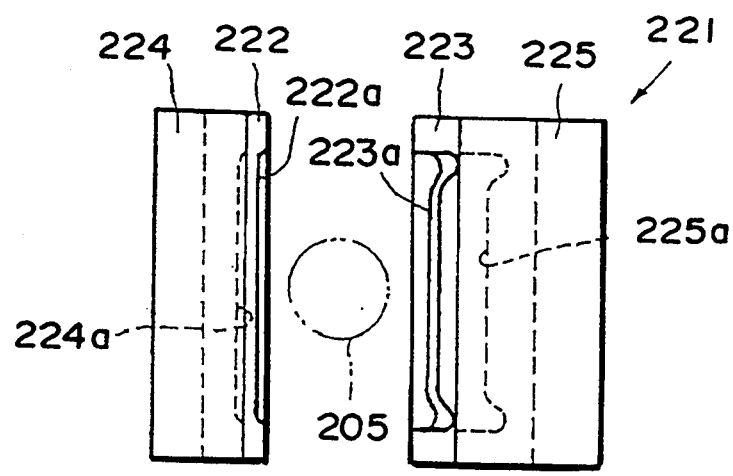
FIG. 35 is a bottom view of the blow mold shown in FIG. 33.
Figure 36:
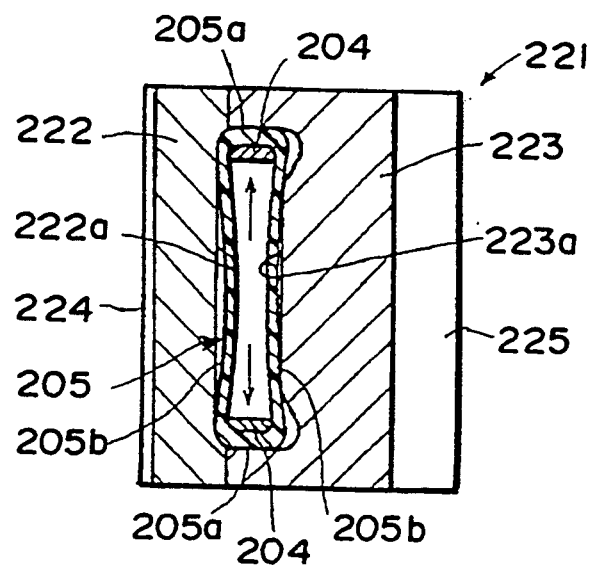
FIG. 36 is a view similar to FIG. 28 but in the blow mold shown FIG. 33.

The expander panels 204 are inserted into the parison 205 from below as shown in FIG. 33, and then the left and right mold parts 222 and 223 are closed with the left and right pinch-off molds 224 and 225 retracted, whereby the parison 205 is pinched off at the upper portion. Thereafter the expander panels 204 are moved away from each other to press the parison 205 against the inner surface of the left and right mold parts 222 and 223 as shown in FIG. 36, and then the expander panels 204 are drawn downward. Since the pinch-off molds 224 and 225 are retracted and the bottom of the blow mold 221 is open, the expander panels 204 can be drawn out without interfering with the mold 221.

Figure 37:
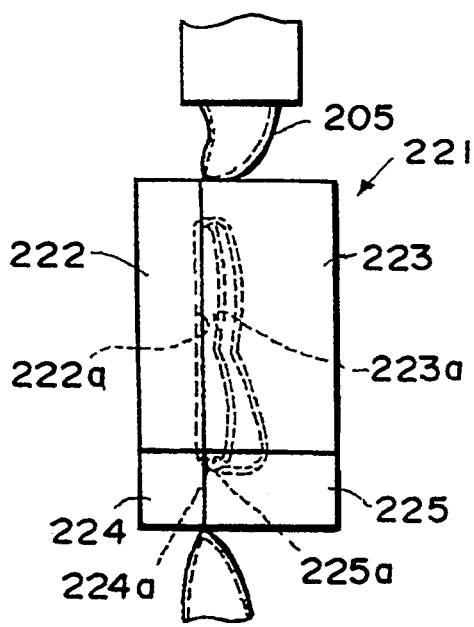
FIG. 37 is a view similar to FIG. 29 but in the blow mold shown FIG. 33.

After the expander panels 204 are drawn out, the pinch-off molds 224 and 225 are closed and the parison 205 is pinched off at the lower portion as shown in FIG. 37.

This example is advantageous in that since it is provided with the pinch-off molds 224 and 225, a proper pinch-off position can be easily set according to the shape of the article. In this example, the parison 205 is stretched with the left and right mold parts 222 and 223 are closed. This is advantageous as follows. That is, when the mold is closed after stretch of the parison as in the preceding example, one of the thinned portions of the parison can be brought into contact with the left mold half and begins to be cooled earlier than the other thin portion, which adversely affects the blow article and can result in deformation of the article. On the other hand, in the case of the mold of this example, the thin portions 205b simultaneously begin to be cooled and the problem can be avoided. Though, in the example described above, the pinch-off molds 224 and 225 also define a part of the cavity, they may be solely for pinching off the parison.

Figure 38:
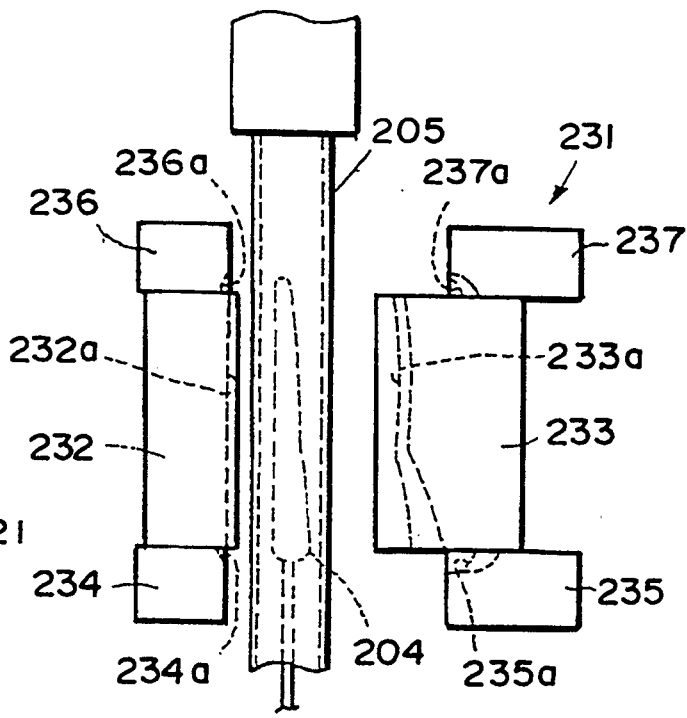
FIG. 38 is a view similar to FIG. 27 but showing the parison with still another blow mold which is suitable for use in the blow molding system of the present invention.
Figure 39:
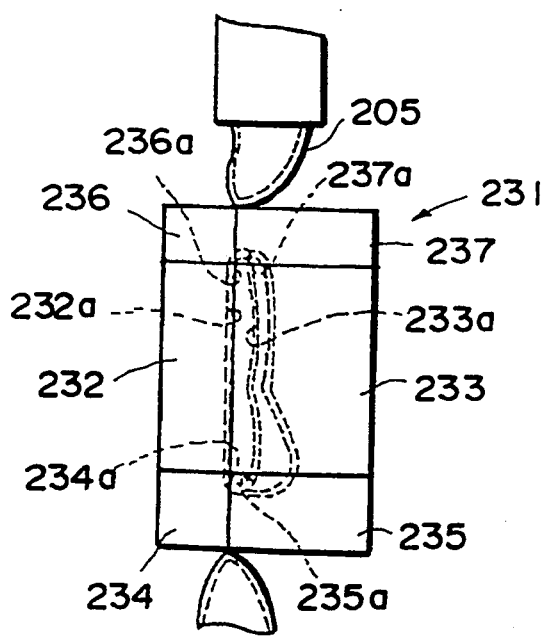
FIG. 39 is a view similar to FIG. 29 but in the blow mold shown FIG. 38.
Figure 40:
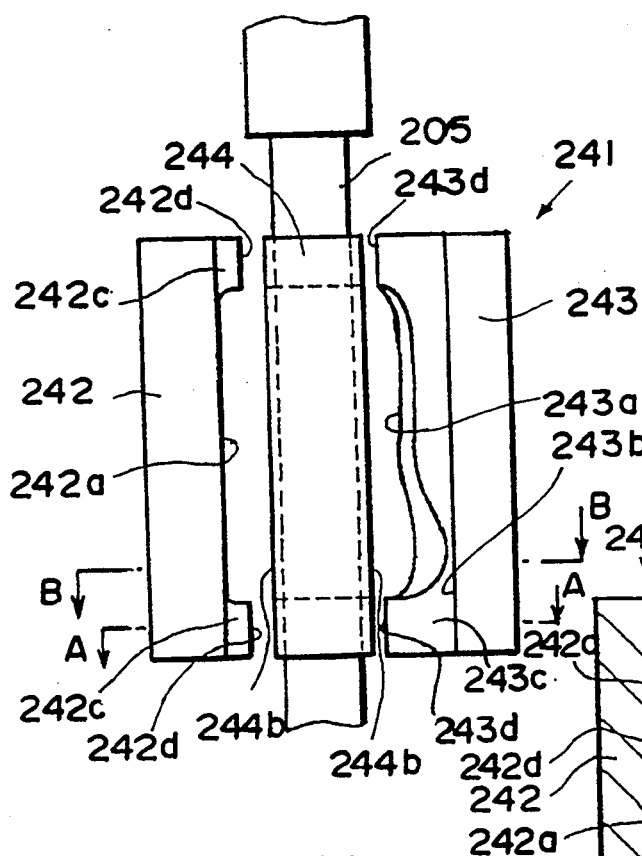
FIG. 40 is a front view for illustrating the step of expanding the parison in an still another blow mold which is suitable for use in the blow molding system of the present invention.
Figure 42:
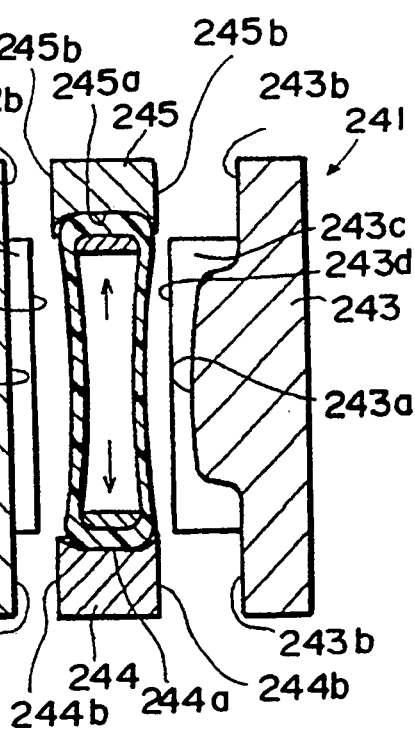
FIG. 42 is a cross-sectional view taken along line B—B in FIG. 41.
Figure 41:
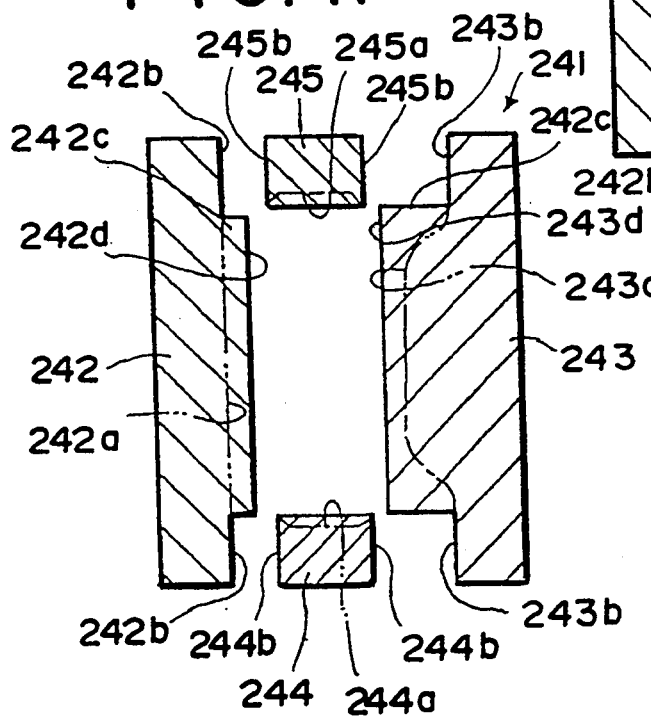
FIG. 41 is a cross-sectional view taken along line A—A in FIG. 41.

The blow mold 231 shown in FIGS. 38 and 39 comprises left and right mold parts 232 and 233, left and right lower pinch-off molds 234 and 235 and left and right upper pinch-off molds 236 and 237. The surfaces against which the thickened portions 205a are to be pressed are defined by both the left and right mold parts 232 and 233 in this example. The left upper and lower pinch-off molds 234 and 236 are movable left and right relative to the left mold part 232, and the right upper and lower pinch-off molds 225 and 227 are movable left and right relative to the right mold part 233. The cavity is defined by cavity portions 32a to 37a formed in the mold parts 232 and 233 and the pinch-off molds 234 to 237 when the blow mold 231 is closed as shown in FIG. 39.

The expander panels 204 are inserted into the parison 205 from below as shown in FIG. 38, and then the left and right mold parts 232 and 233 are closed with the left and right lower and upper pinch-off molds 2234 to 237 retracted. Thereafter the expander panels 204 are moved away from each other to press the parison 205 against the inner surface of the left and right mold parts 232 and 233, and then the expander panels 204 are drawn downward. Since the left and right lower pinch-off molds 234 and 235 are retracted and the bottom of the blow mold 231 is open, the expander panels 204 can be drawn out without interfering with the mold 231.

After the expander panels 204 are drawn out, the pinch-off molds 234 to 237 are closed and the parison 205 is pinched off at the lower and upper portions as shown in FIG. 39.

Similarly to the preceding example, this example is advantageous in that since it is provided with the pinch-off molds 234 to 237, proper pinch-off positions can be easily set according to the shape of the article. In this example, the parison 205 is stretched with the left and right mold parts 232 and 233 are closed. This is advantageous for the reason described above in conjunction with the preceding example. Further the pinch-off molds 234 to 237 may be solely for pinching off the parison.

Figure 43:
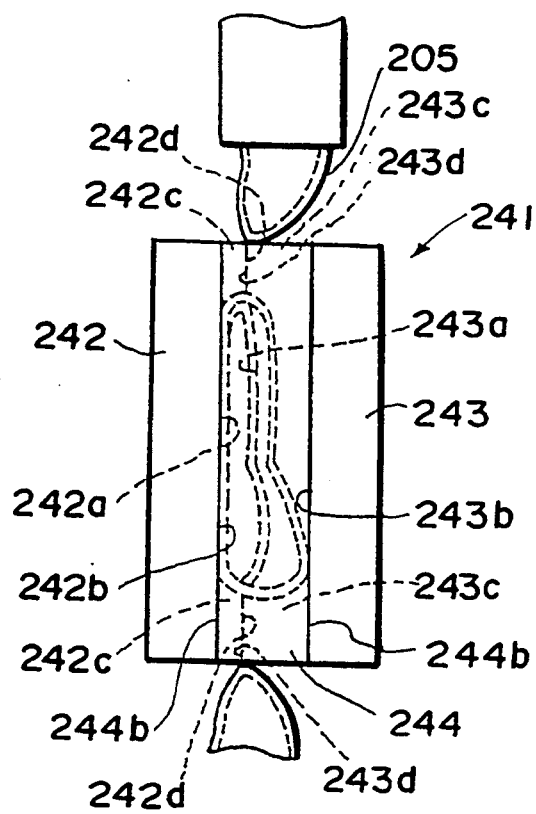
FIG. 43 is a view similar to FIG. 29 but in the blow mold shown FIG. 40.

The blow mold 241 shown in FIGS. 40 to 44 comprises left and right pinch-off mold parts 242 and 243 and a pair of side mold parts 244 and 245 which are opposed to each other at a distance corresponding to the width of the seatback frame between the left and right pinch-off mold parts 242 and 243 in the direction perpendicular to the direction in which the left and right pinch-off mold parts 242 and 243 are opposed. The cavity is defined by cavity portions 242a to 245a formed in the mold parts 242 to 245 when the blow mold 241 is closed as shown in FIG. 43. In the closed state, side portions of the front faces of the left and right pinch-off mold parts 242 and 243 are in contact with the side faces 244b and 245b, and the front surfaces 242d and 243d of upper and lower projections 242c and 243c formed on the front faces of the left and right pinch-off mold parts 242 and 243 are in contact with each other between the side mold parts 244 and 245 above and below the cavity.

With the left and right pinch-off mold parts 242 and 243 away from the side mold parts 244 and 245, the expander panels 204 are inserted into the parison 205 and moved away from each other to press the thickened portions 205a against the inner surfaces of the side mold parts 244 and 245. Then the expander panels 204 are drawn out. At this time the pinch-off mold parts 242 and 243 are away from the side mold parts 244 and 245 and the bottom of the blow mold 241 is open. Accordingly, the expander panels 204 can be easily drawn with out interference with the blow mold 241.

Figure 44:
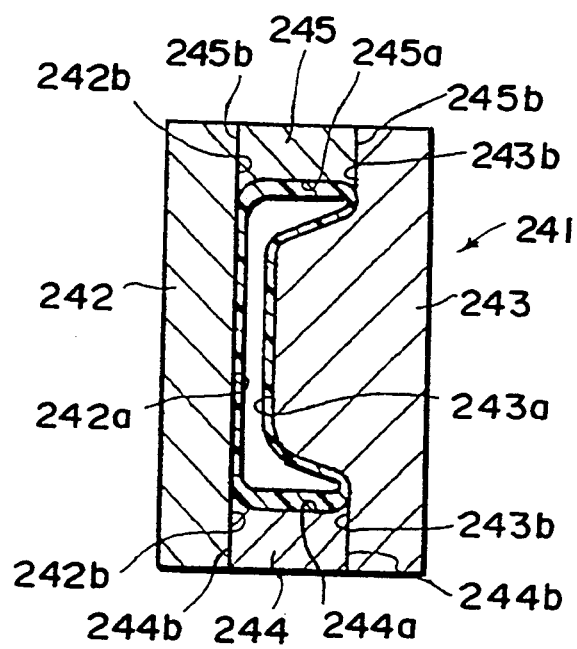
FIG. 44 is a cross-sectional view of FIG. 43, and FIGS. 45 to 47 are views similar to FIGS. 1A to 1C but in accordance with still another embodiment of the present invention.

Thereafter, the pinch-off mold parts 242 and 243 are moved toward each other and the blow mold 241 is closed as shown in FIGS. 43 and 44. In response to closure of the blow mold 241, the parison 205 is pinched off at the lower and upper portions by the upper and lower projections 242c and 243c of the left and right pinch-off mold parts 242 and 243.

In this example, the thin portions of the parison 205 cannot be brought into contact with the blow mold 241 when the parison 205 is pressed against the inner surfaces of the side mold parts 244 and 245. This is advantageous for the reason described above in conjunction with the previous examples.

Though, in the embodiments described above, the parison is provided with thickened portions as it is extruded from the extruder, the blown article can be thickened at a desired part, even if the parison has uniform thickness, by expanding the parison applying an expander panel to the portion of the parison which forms the part of the article to be thickened. That is, when a part of the parison is brought into contact with the expander panel, the part is cooled and becomes harder than the other part, and accordingly, the part is less stretched than the other part during expansion of the parison, whereby the part brought into contact with the expander panel becomes thicker than the other part after the expansion of the parison.

Figure 45:
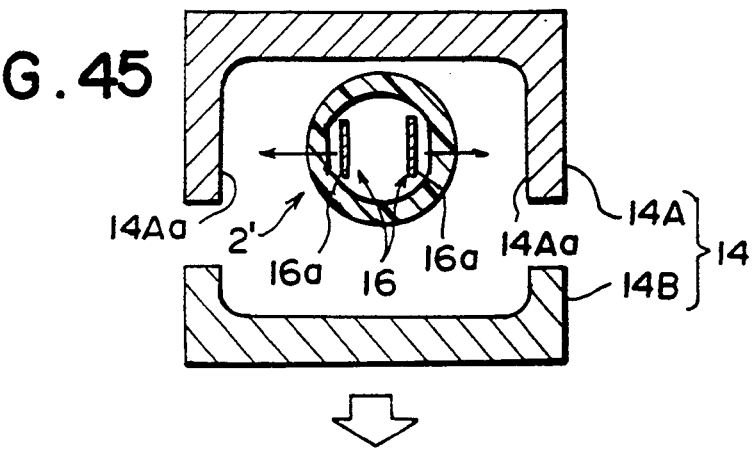
Figure 46:
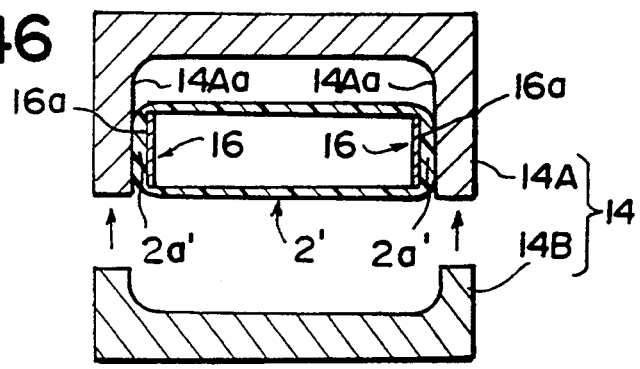
Figure 47:
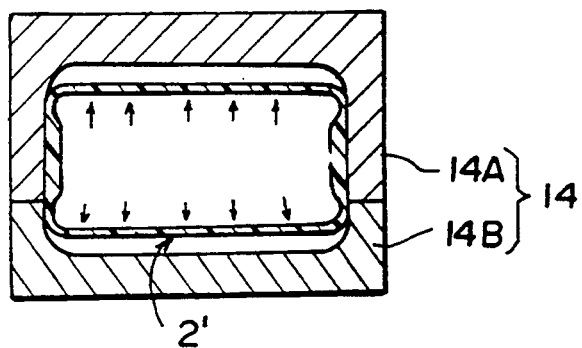

In the embodiment shown in FIGS. 45 to 47, the parison 2' is uniform in thickness over the entire periphery thereof as shown in FIG. 45. The expander panels 16 are inserted into the parison 2' and are moved away from each other to expand the parison 2' and press it against the inner surface of the mold half 14A. The parts of the parison 2' which are brought into contact with the abutment surfaces 16a of the expander panels 16 a cooled and becomes harder than the other part. Accordingly, the parts between the parts 2a' in contact with the expander panels 16 mainly stretched during expansion and the parts 2a' in contact with the expander panels 16 are left substantially in the original thickness as shown in FIG. 46. Thus the parts 2a' are thickened relative to the other parts. During subsequent blow molding, the parts between the parts 2a' pressed against the inner surface of the mold half 14A are further stretched and become thinner while the parts 2a' pressed against the inner surface of the mold half 14A are left substantially in the original thickness since the parts 2a' are cooled by the mold half 14A and becomes further harder.

What is claimed is:

1. A method of blow molding a resin article having a pair of thickened parts comprising the steps of suspending a parison between halves of a blow mold the inner surface of which defines the outer shape of the article to be molded, pinch-off mold portions being provided on lower portions of the mold halves with the pinch-off mold portions being movable relative to the mold halves between a pinch-off position where said pinch-off mold portions abut against each other to pinch off the parison and a retracted position where the pinch-off mold portions are spaced from each other to give access to the space between inner surfaces of the mold halves, inserting a pair of expander panels into the space inside the parison, each of the expander panels have an abutment surface which substantially conforms in shape to a part of the inner surface of the blow mold which corresponds to one of the pair of thickened parts of the article.

moving the expander panels away from each other toward said parts of the inner surface of the blow mold to press said abutment surfaces of the expander panels against a pair of parts of the parison which are diametrically opposed to each other with the mold halves closed and the pinch-off mold portions in the retracted position, removing the expander panels away from the blow mold through the space between the pinch-off mold portions, moving the pinch-off mold portions to the pinch-off position, and blowing pressurized gas into the parison.

2. A method of blow molding a resin article having at least one thickened part comprising the steps of:

extruding a parison in a first direction;

suspending the parison between halves of a blow mold the inner surface of which defines the outer shape of the article to be molded;

inserting an expander panel into the space inside the parison by moving it in a second direction which is opposite to said first direction, said expander panel having an abutment surface which substantially conforms in shape to a part of the inner surface of the blow mold which corresponds to the thickened part of the article;

moving the expander panel, in a third direction which is substantially perpendicular to said first and second directions, toward said part of the inner surface of the blow mold to press thereagainst said abutment surface of the expander panel sandwiching a part of the parison between the blow mold and the expander panel;

removing the expander panel from the space inside the parison by moving it away from the blow mold in said first direction;

closing the blow mold; and blowing pressurized gas into the parison after the step of removing said expander panel.

3. A method as defined in claim 2 in which said parison is nonuniform in thickness in the radial direction and said expander panel presses a thicker portion of the parison against the inner surface of the blow mold.

4. A method of blow molding a resin article having at least one thickened part comprising the steps of:

extruding a parison;

suspending the parison between halves of a blow mold the inner surface of which defines the outer shape of the article to be molded:

inserting an expander panel into the space inside the parison, said expander panel having an abutment surface which substantially conforms in shape to a part of the inner surface of the blow mold which corresponds to the thickened part of the article;

moving the expander panel in one direction toward said part of the inner surface of the blow mold to press thereagainst said abutment surface of the expander panel sandwiching a part of the parison between the abutment surface of the expander panel and a corresponding surface of one of the halves of the blow mold;

closing the blow mold in another direction which is substantially perpendicular to said one direction after the step of moving the expander panel; and blowing pressurized gas into the parison.

5. A method as defined in claim 4 in which said parison is nonuniform in thickness in the radial direction and said expander panel presses a thicker portion of the parison against the inner surface of the blow mold.

6. A method as defined in claim 4 in which said steps of closing the blow mold and blowing pressurized gas into the parison are performed with said expander panel left on the parison and fixed thereto.

7. A method as defined in claim 6 in which said parison is formed of reinforced resin and said expander panel is formed of non-reinforced resin.

8. A method as defined in claim 6 in which said expander panel is thickened at a portion which corresponds to the part of the blown article which is to support a heavy load.

9. A method of blow molding a resin article having a pair of thickened parts comprising the steps of:

extruding a parison in a first direction;

suspending the parison between halves of a blow mold the inner surface of which defines the outer shape of the article to be molded:

inserting a pair of expander panels into the space inside the parison by moving them in a second direction which is opposite to said first direction, each of the expander panels having an abutment surface which substantially conforms in shape to a part of the inner surface of the blow mold which corresponds to one of the pair of thickened parts of the article;

moving the expander panels, in a pair of opposite directions which are substantially perpendicular to said first and second directions, away from each other toward said pairs of the inner surface of the blow mold to press thereagainst said abutment surfaces of the expander panels sandwiching a pair of parts of the parison which are diametrically opposed to each other between the blow mold and the expander panels:

removing the expander panels from the space inside the parison by moving them away from the blow mold in said first direction:

closing the blow mold: and blowing pressurized gas into the parison after the step of removing said expander panels.

10. A method of blow molding a resin article having a pair of thickened pans comprising the steps of:

extruding a parison;

suspending the parison between halves of a blow mold the inner surface of which defines the outer shape of the article to be molded:

inserting a pair of expander panels into the space inside the parison, each of the expander panels having an abutment surface which substantially conforms in shape to a part of the inner surface of the blow mold which corresponds to one of the pair of thickened parts of the article:

moving the expander panels in a pair of opposite directions away from each other toward said parts of the inner surface of the blow mold to press thereagainst said abutment surfaces of the expander panels sandwiching a pair of parts of the parison, which are diametrically opposed to each other, between the abutment surfaces of the expander panels and corresponding surfaces of one of the halves of the blow mold:

closing the blow mold in a direction which is substantially perpendicular to said pair of opposite directions after the step of moving said expander panels: and blowing pressurized gas into the parison.

11. A method of blow molding a resin article having at least one thickened part comprising the steps of:

extruding a parison in a first direction;

suspending the parison between halves of a blow mold the inner surface of which defines the outer shape of the article to be molded:

inserting at least one expander panel into the space inside the parison by moving it in a second direction which is opposite to said first direction, said expander panel having an abutment surface which substantially conforms in shape to a part of the inner surface of the blow mold which corresponds to the thickened part of the article;

moving said at least one expander panel in a third direction which is substantially perpendicular to said first and second directions, toward said part of the inner surface of the blow mold to press thereagainst said abutment surface of said at least one expander panel sandwiching a part of the parison between the abutment surface of said at least expander panel and a corresponding surface of one of the halves of the blow mold;

removing said at least one expander panel from the space inside the parison by moving it away from the blow mold in said first direction;

closing the blow mold in as fourth direction which is substantially perpendicular to said first and second directions on one hand and also substantially perpendicular to said third direction on the other hand: and blowing pressurized gas into the parison after the step removing said at least one expander panel.

12. A method of blow molding a resin article having at least one thickened part comprising the steps of:

extruding a parison in a first direction;

suspending the parison between halves of a blow mold the inner surface of which defines the outer shape of the article to be molded:

positioning an expander panel in the space inside the parison by a relative movement between the parison and the expander panel in a second direction which is opposite to said first direction when viewed with respect to said parison, said expander panel having an abutment surface which substantially conforms in shape to a part of the inner surface of the blow mold which corresponds to the thickened part of the article;

moving the expander panel, in a third direction which is substantially perpendicular to said first and second directions, toward said part of the inner surface of the blow mold to press thereagainst said abutment surface of the expander panel sandwiching a part of the parison between the blow mold and the expander panel;

removing the expander panel from the space inside the parison by moving it away from the blow mold in said first direction;

closing the blow mold; and blowing pressurized gas into the parison after the step removing said expander panel.

13. A method of blow molding a resin article having a pair of thickened parts comprising the steps of:

extruding a parison in a first direction;

suspending the parison between halves of a blow mold the inner surface of which defines the outer shape of the article to be molded:

positioning a pair of expander panels in the space inside the parison by a relative movement between the parison and the expander panels in a second direction which is opposite to said first direction when viewed with respect to said parison, each of the expander panels having an abutment surface which substantially conforms in shape to a part of the inner surface of the blow mold which corresponds to one of the pair of the thickened parts of the article;

moving the expander panels, in a pair of opposite directions which are substantially perpendicular to said first and second directions, away from each other toward said pans of the inner surface of the blow mold to press thereagainst said abutment surfaces of the expander panels sandwiching a pair of parts of the parison which are diametrically opposed to each other between the blow mold and the expander panels;

removing the expander panels from the space inside the parison by moving them away from the blow mold in said first direction;

closing the blow mold; and blowing pressurized gas into the parison after the step of removing said expander panels.

* * * * *